United States Patent [19]

Martin et al.

[11] 4,157,327

[45] Jun. 5, 1979

[54] THERMALLY CONDUCTIVE CAULK

[75] Inventors: Ronald G. Martin, Chicopee Falls, Mass.; Joseph Powers, Riverside; John C. Trocciola, Glastonbury, both of Conn.

[73] Assignee: United Technologies Corporation, Hartford, Conn.

[21] Appl. No.: 864,947

[22] Filed: Dec. 27, 1977

[51] Int. Cl.$^2$ ............................ C08J 3/20; C08K 3/04
[52] U.S. Cl. ............................ 260/42.27; 260/29.6 F; 260/42.55; 429/26
[58] Field of Search ............. 260/42.27, 42.55, 29.6 F; 429/26

[56] References Cited

U.S. PATENT DOCUMENTS

| T884,008 | 3/1971 | Gumerman | 260/42.27 |
|---|---|---|---|
| 2,782,179 | 2/1957 | Lontz | 260/42.27 |
| 2,782,180 | 2/1957 | Weidman | 260/42.27 |
| 3,684,755 | 8/1972 | Gumerman | 260/42.27 |
| 3,772,249 | 11/1973 | Morgans | 260/42.55 |
| 3,801,374 | 4/1974 | Dews et al. | 429/26 |
| 3,964,930 | 6/1976 | Reiser | 429/26 |
| 4,038,244 | 7/1977 | Ogden et al. | 260/29.6 F |
| 4,053,443 | 10/1977 | Reick et al. | 260/29.6 F |

FOREIGN PATENT DOCUMENTS

| 50-58158 | 5/1975 | Japan | 260/42.27 |
|---|---|---|---|
| 51-28136 | 3/1976 | Japan | 260/42.27 |

*Primary Examiner*—Ronald W. Griffin
*Attorney, Agent, or Firm*—Stephen E. Revis

[57] ABSTRACT

A thermally conductive caulk particularly suited for use in a phosphoric acid fuel cell is made by mixing graphite into a stable aqueous dispersion of polytetrafluoroethylene and fluorinated ethylene propylene such that the solids floc to form a paste. The paste is applied to the part to be caulked and then dried and heat treated. Caulks made according to the present invention have good thermal conductivity and absorb very little phosphoric acid.

16 Claims, 2 Drawing Figures

U.S. Patent  Jun. 5, 1979  4,157,327
FIG. 1
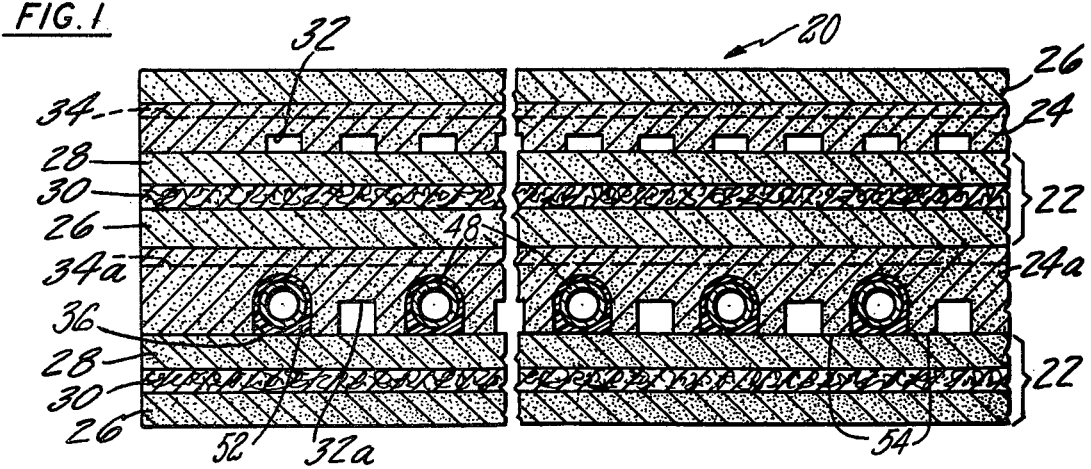
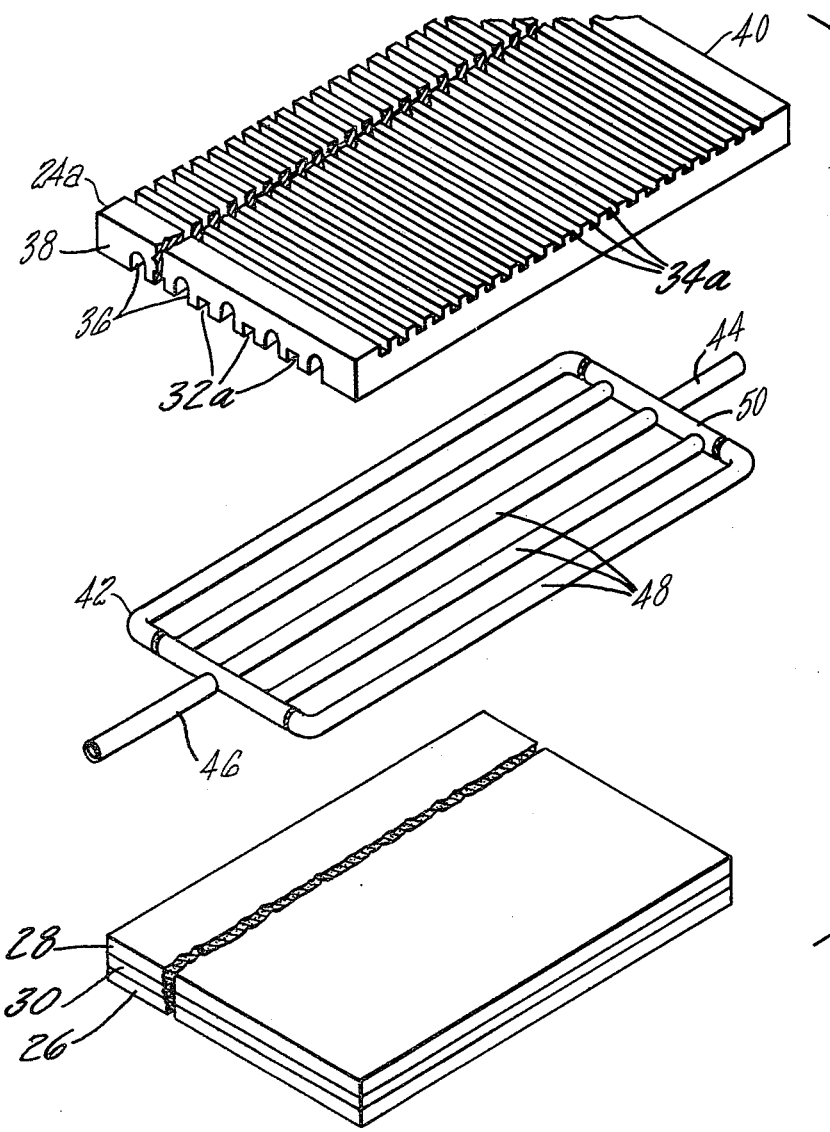
FIG. 2

THERMALLY CONDUCTIVE CAULK

BACKGROUND OF THE INVENTION

1. Field of the Invention

This invention relates to thermally conductive caulking compounds and a process for making said compounds.

2. Description of the Prior Art

A fuel cell power section comprises a plurality of individual cells electrically connected in series. The cells convert reactants such as hydrogen into DC electrical power in a manner well known in the art. Separator plates are disposed between individual cells and may be provided with flow passages to bring the reactants into the cells. The electrochemical reaction produces, as a by-product, heat which must be removed in a controlled manner to maintain the cells at the desired operating temperature. For efficient operation it is desirable to maintain the cells at a uniform temperature and at a maximum temperature level consistent with material compatibility characteristics.

A well known method for removing waste heat from a fuel cell power section is to use heat exchange surfaces parallel to the plane of the cells. These heat exchange surfaces often take the form of passageways through the separator plates; the passageways carry a coolant fluid. Intimate contact between the coolant fluid and the separator plates provides high heat transfer capabilities between the cells and the cooling medium thereby minimizing the temperature gradient therebetween. In commonly owned U.S. Pat. No. 3,880,670 to Byron H. Shinn the coolant is carried directly within these passageways, and contacts the surfaces of the passageways. Commonly owned U.S. Pat. No. 3,990,913 to Jerome G. Tuschner shows the coolant fluid being carried by tubes disposed within these passageways. This latter technique solves sealing and materials compatibility problems as between the coolant fluid and the fuel cell components. In yet another commonly owned U.S. Pat. No. 3,964,930 to Carl A. Reiser the coolant carrying tubes are not completely enclosed within the separator plate, but are instead adjacent the electrodes and are exposed to the electrolyte used in the stack. In the stack designs shown in Reiser and in Tuschner the tubes must be made from or at least include a protective coating of material which is stable in the fuel cell electrolyte. Also, as more fully discussed in Tuschner, it is highly desirable that the coolant tubes be completely surrounded by a thermally conductive material to aid in the transfer of heat from the cells to the coolant within the tubes. Tuschner describes a grease-like material comprised of a phosphoric acid base with a graphite filler which is stable in phosphoric acid and which is thermally conductive.

While the ability to transfer heat from the cells to the coolant flowing through the tubes is, of course, very important, it is also extremely important that the tubes do not corrode in the phosphoric acid environment of the cell. In both Tuschner and Reiser protection from corrosion is entirely dependent upon the material from which the coolant tube is made, or, more likely, upon the integrity of a protective coating on the tube itself. Typically the tubes may be made from copper which has been coated with a thin layer of polytetrafluoroethylene or perfluoroalkoxy (PFA). The latter coating (PFA) presents a special problem in that it begins to soften excessively if subjected to temperatures above about 630° F.

It would be highly desirable to prevent the phosphoric acid electrolyte from coming into contact with the coolant tubes. This would eliminate the risk of corrosion. If the heat transfer caulking material surrounding the tube did not absorb phosphoric acid, or if it absorbed very little phosphoric acid, this would at least reduce the risk and/or rate of corrosion. Available caulking materials with suitable thermal conductivity properties absorb unacceptably large amounts of phosphoric acid. Prior to the present invention there has been no known caulking compound with the combination of high thermal conductivity and low rate of phosphoric acid absorption, as well as the ability to retain its sealing characteristics and other essential properties in the fuel cell environment.

SUMMARY OF THE INVENTION

One object of the present invention is a caulking compound suitable for use is a phosphoric acid fuel cell environment and process for making the same.

A further object of the present invention is a caulking compound which has good thermal conductivity.

Another object of the present invention is a caulking compound which can easily be extruded and has good strength.

Yet another object of the present invention is a caulking compound which resists absorption of phosphoric acid over an extended period of time.

Accordingly, a thermally conductive caulk according to the present invention is made by forming an intermediate compound by adding sufficient small particle graphite to a stable aqueous dispersion of polytetrafluoroethylene (PTFE) and fluorinated ethylene propylene (FEP) such that the solids floc; applying the compound to the area to be caulked; drying the compound, and heating the dried compound to above the melting point of the FEP.

By this method we have been able to make caulking compounds with a coefficient of thermal conductivity of greater than 1.0 BTU/ft.hr. °F. and which absorb phosphoric acid to the extent of less than one percent of their weight.

It is both interesting and surprising that if this caulk is made by dispersing powdered PTFE and FEP and powdered graphite into a water plus thickener solution, rather than by adding powdered graphite to a stable aqueous dispersion of PTFE and FEP (all other steps being substantially the same) the finished caulk will absorb many times more acid than absorbed by a caulk made by the present invention under similar conditions.

The foregoing and other objects, features, and advantages of the present invention will become more apparent in the light of the following detailed description of the preferred embodiments thereof as illustrated in the accompanying drawing.

BRIEF DESCRIPTION OF THE DRAWING

FIG. 1 is a sectional view of part of a fuel cell stack which incorporates the caulk compound of the present invention.

FIG. 2 is an illustrative, exploded perspective view of a separator plate, fuel cell and cooler tubes of the stack shown in FIG. 1.

DESCRIPTION OF THE PREFERRED EMBODIMENTS

The process of the present invention begins with a stable aqueous dispersion of PTFE and FEP. This dispersion is made by mixing together appropriate amounts of a stable aqueous dispersion of PTFE and a stable aqueous dispersion of FEP. A suitable PTFE dispersion is Dupont's TFE-30 which comprises, by weight, about 60% PTFE, 34% $H_2O$, and 6% surfactant as a stabilizer. A suitable FEP dispersion is Dupont's TFE 120 which comprises, by weight, about 55% FEP, 39% $H_2O$, and 6% surfactant as a stabilizer. In this application the word "stable" means that the particles remain suspended in the liquid medium without stirring.

At this point, a floccing agent is added to the mixture, such as isopropyl alcohol, although any floccing agent which can be removed by subsequent heating would be suitable. The use of a floccing agent is not required, but it is desirable for our particular application as will be later explained. It has been determined that anywhere from about 25% to 35% by weight isopropanol (based on total weight of solids plus isopropanol) works best. Less than about 25% results in a compound which is very difficult to extrude; greater than about 35% will yield a compound which is too watery.

Sufficient particulate graphite is then stirred into this PTFE/FEP dispersion so as to cause all the solids (i.e., the PTFE, FEP and graphite) to floc. Stirring is continued until a uniform distribution of graphite is obtained. The floc will be like a paste with a consistency determined by the ratio of the various solids in the floc as well as the amount of water in the floc. It has been found that the mixture will not properly floc if the solids therein comrpise greater than 70% by weight PTFE and FEP combined.

Good thermal and electrical conductivity are dependent upon low porosity in the finished product. Low porosity is dependent upon close packing of the particulate material. This requires the use of small particle size graphite as well as a distribution of graphite particle sizes. We prefer Asbury #230-U graphite manufactured by the Asbury Corporation. The specification of 230-U graphite indicates that 99% of the particles are less than 325 mesh; and its particle size distribution is from 0.5 to 44.0 microns with a mean particle size of about 1.9 microns. Other small particle graphites with at least a bimodal particle size distribution would also be suitable.

The next step in the process is to apply the floc or paste to the area or surface of the part to be caulked. The method for applying the paste is not critical to the present invention. It is preferred, however, to use an extrusion method such as by squeezing the paste from a caulking gun.

After applying the paste, the water is slowly removed by drying the paste, such as by leaving the caulked article at room temperature overnight and then heating at 250° F. for three hours. The dried paste compound will have a wax-like consistency. The drying temperature is not critical; however, if the paste is dried too fast, bubbles may be created in the mixture which are undesirable since they will reduce thermal conductivity of the finished caulk.

The material at this point has poor strength in that it is somewhat friable and can crack under mechanical stresses. The next step overcomes this strength problem, and involves heating the dried paste compound to at least the initial melting point (about 560° F.) of FEP. 700° F. should not be exceeded because the FEP begins to degrade to an excessive extent. High temperatures are also generally undesirable because the article being caulked may be harmed during this step. Generally, the longer the temperature is held within the aforementioned temperature range, the better the acid absorption resistance; however, after one or two hours the benefits may not be very significant. A preferred heat treatment is between 560° F. and 640° F. for at least ½ hour. A most preferred heat treatment is between 600° F. and 620° F. for at least one hour.

With regard to the present invention, acid absorption resistance is measured by immersing the finished caulk in a bath of 400° F. 105 weight percent concentration phosphoric acid for a period of 65 hours followed by measuring how much acid is absorbed in terms of percent weight gain of the original caulk. Assuming one uses this acid absorption test, any weight gain of less than about 10% (assuming retention of high thermal conductivity and strength) represents a significant improvement over the prior art. For fuel cell applications a weight gain of less than about 6% is preferred and below 1.0% is most preferred.

Another factor which must be considered with regard to the present invention is that acid absorption is reduced as graphite content of the paste is decreased. However, thermal conductivity of both FEP and PTFE solids is only about 0.13 BTU/ft. hr. °F. while the coefficient of thermal conductivity for graphite is about 30 BTU/ft. hr. °F. Thus, the lower the graphite content, the lower the thermal conductivity. A good balance must, therefore, be struck. For the purposes of the present invention, a caulk is considered to have good thermal conductivity if its coefficient of thermal conductivity is at least 0.4 BTU/ft. hr. °F. Preferably the thermal conductivity should be at least 0.6 BTU/ft. hr. °F., and most preferably greater than 0.8 BTU/ft. hr. °F.

From test data and other experience it has been determined that the solids content of the intermediate paste compound (which is the same as the solids content of the finished caulk) must comprise at least 50% PTFE and FEP (i.e., less than 50% graphite) and no more than 70% PTFE and FEP combined; 50–60% PTFE and FEP is preferred, with the balance being graphite. If less than 50% of the solids is PTFE and FEP the paste may be too dry for easy and proper application and will absorb too much acid; also, it may not adhere well to the surface to which it is being applied and the finished caulk may not have good strength. As heretofore mentioned, the solids do not floc properly if they comprise greater than 70% PTFE and FEP.

The ratio of FEP to PTFE is also important to the properties of the finished caulk. Suitable caulks can be made with ratios of FEP to PTFE of anywhere from 3:1 to 1:10. Preferred ratios are from 2:1 to 1:3. A ratio of FEP to PTFE of about 1:1 is most preferred. Although tests on caulks containing no FEP (i.e., all PTFE and graphite) and heat treated to temperatures on the order of 600° F. show good thermal conductivity and good short term acid resistance, long term acid resistance is not expected to be satisfactory, and therefore at least a 1:10 ratio of FEP to PTFE is considered necessary. Too little FEP also reduces strength. On the other hand, caulks containing no PTFE (i.e., all FEP and graphite) would not floc at all without using a floccing agent; and even then the coefficient of thermal conductivity, the ease of extrusion, and the strength of the caulk are not particularly preferred. Excessive FEP also makes floccing difficult and increases acid absorption. Mixtures comprising more FEP than PTFE should be made using a floccing agent if good extrudability is desired.

For additional strength it may be desirable, and is within the scope of the present invention, to replace some of the graphite powder with carbon fibers. For our particular application sufficient strength is obtained without the need for carbon fibers.

The table below presents data for several samples of caulk made with varying amounts of PTFE, FEP and graphite and under various process conditions.

channels 34a are perpendicular to the reactant carrying channels, each extending from one side of the plate to the other and being fed by manifolds which are not shown. In this embodiment the electrodes are of the well-known gas diffusion type suitable for use with air as the oxidant and hydrogen-containing gas as the reactant.

Referring to FIG. 2, which is an exploded view of a cell and separator plate, disposed between each reactant carrying channel 32a in the separator plate 24a are passageways 36 which extend from one end 38 of the plate 24a to the other end 40 of the plate. A cooler 42 designed to carry a nondielectric coolant into heat transfer relationship with the cells 22 is also shown in

TABLE

| Sample # | FEP (wt %)[a] | PTFE (wt %)[a] | Graphite (wt %)[a] | FEP:PTFE | Isopropanol (wt %)[b] | Drying | | Heat Treatment | |
|---|---|---|---|---|---|---|---|---|---|
| | | | | | | Temp (°f.) | Time (hrs) | Temp (°f.) | Time (hrs) |
| 1 | 30.0 | 30.0 | 40.0 | 1:1 | 0 | R.T./250[c] | 16/3[c] | 600 | 0.5 |
| 2 | 30.0 | 30.0 | " | 1:1 | " | " | ". | 600 | 1.0 |
| 3 | 15.0 | 45.0 | " | 1:3 | " | " | " | " | " |
| 4 | 45.0 | 15.0 | " | 3:1 | " | " | " | " | " |
| 5 | 5.5 | 54.5 | " | 1:10 | " | " | " | " | " |
| 6 | 40.0 | 20.0 | " | 2:1 | " | " | " | " | " |
| 7 | 54.5 | 5.5 | " | 10:1 | " | discarded : did not floc | | | |
| 8 | 60.0 | 0.0 | " | 1:0 | " | discarded - did not floc | | | |
| 9 | 0.0 | 60.0 | " | 0:1 | " | R.T./250[c] | 16/3[c] | 600 | 1.0 |
| 10 | 30.0 | 30.0 | " | 1:1 | 18. | 160/250[d] | 16/2[d] | " | " |
| 11 | 30.0 | 30.0 | " | 1:1 | 26. | " | " | " | " |
| 12 | 30.0 | 30.0 | " | 1:1 | 32. | " | " | " | " |
| 13 | 40.0 | 20.0 | " | 2:1 | 32. | R.T./250[c] | 16/3[c] | " | " |
| 14 | 45.0 | 15.0 | " | 3:1 | 32. | " | " | " | " |
| 15 | 60.0 | 0.0 | " | 1:0 | 32 | " | " | " | " |

| Sample # | Coefficient of Thermal Conductivity (BTU/ft.hr.°f) | Acid Gain (% wt. gain) | Porosity (%) | Ease of Extrusion | Strength |
|---|---|---|---|---|---|
| 1 | 1.4 | 3.0 | 31. | E | G |
| 2 | 1.6 | 1.0 | 32. | E | E |
| 3 | 0.6 | 1.0 | 35. | E | E |
| 4 | 0.7 | 3.0 | 28. | P | E |
| 5 | 0.8 | 1.0 | 34. | E | E |
| 6 | 0.9 | 3.0 | 48. | P | E |
| 7 | discarded-did not floc | | | | |
| 8 | discarded-did not floc | | | | |
| 9 | 0.6 | 2.0 | 35. | E | G |
| 10 | 0.7 | 1.0[e] | 37. | P | E |
| 11 | 0.8 | 0.8 | 40. | G | E |
| 12 | 0.8 | 0.6 | 40. | E | E |
| 13 | 0.75 | No data | 39. | E | E |
| 14 | 0.9 | No data | 40. | E | E |
| 15 | 0.6 | No data | 47. | G | G |

[a]-weight percent based on solids only
[b]-weight percent based on solids plus isopropanol
c-room temperature for 16 hours followed by 250° F. for 3 hours
d-room temperature for 16 hours followed by 250° F. for 2 hours
[e]1% wt. gain after 312 hours in 400° F., 105% phosphoric acid
P-poor
G-good
E-excellent As an exemplary use of a caulk made according to the process of the present invention consider the portion of the fuel cell stack 20 shown in FIG. 1. Each stack 20 comprises a plurality of cells 22. Each cell 22 comprises a cathode electrode 26 spaced apart from an anode electrode 28 by an electrolyte retaining matrix 30. The electrolyte in these cells is phosphoric acid. Separator plates 24, 24a are electrically conductive and serve to electrically connect the individual cells 22 in series. Channels 32, 32a in one surface of the separator plates 24, 24a, respectively, carry an oxidant into communication with the cathode electrode 26. Channels 34, 34a in an oppositely facing surface of the separator plates 24, 24a, respectively, carry a reactant into communication with the anode electrodes 28. The oxidant carrying FIG. 2. Each cooler 42 includes an inlet and an outlet 44, 46, respectively, in fluid communication with a plurality of cooler tubes 48. The tubes 48 are disposed within the passageways 36 as shown in FIG. 1. The coolant fluid enters the inlet 44, is distributed to the tubes 48 by means of a distributor 50, passes through the tubes 48 and leaves via the outlet 46.

As the fuel cell stack is being assembled the hereinabove described paste-like compound is applied by means of a caulking gun to the inside surfaces of the passageways 36. The tubes of the cooler 48 are then pressed into the passageways 36. The exposed outward facing surface of the tubes is then also covered with the compound. The tube and separator plate assembly is then placed in the oven to slowly dry the compound.

After the compound is dried the temperature is raised preferably to between 600° F. and 620° F. in accordance with the present invention as hereinabove described. After cooling, the assembly is ready to be placed in the stack adjacent the electrode 28.

In the foregoing procedure, it is apparent that a sufficient amount of the paste-like compound is applied to the passageways 36 and the tubes 48 so that there is a continuous layer of caulk 52 surrounding the entire length of the cooler tubes and there is virtually no air space between the cooler tubes and the surfaces of the passageways.

The desirability of using a floccing agent in the making of the caulk was mentioned above, but not explained. In the present application, it was found that when a floccing agent was not used, small amounts of the FEP would separate from the caulk and coat the adjacent surfaces 54 of the plate 24a. This turned out to be harmful to the electrical conductivity at the coated surfaces 54 and necessitated a surface treatment to remove this coating. The floccing agent eliminated this problem; however, from the Table above, it is apparent that use of a floccing agent reduced the thermal conductivity of the caulk. In this particular application the reduced conductivity had to be tolerated.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. A process for making an electrically conductive and thermally conductive caulk comprising the steps of:
    forming a compound by (1) mixing together a stable aqueous dispersion of fluorinated ethylene propylene and a stable aqueous dispersion of PTFE to form a stable aqueous dispersion of fluorinated ethylene propylene and PTFE and (2) stirring into said dispersion of fluorinated ethylene propylene and PTFE an amount of particulate graphite at least sufficient to cause flocculation of all the fluorinated ethylene propylene and PTFE solids along with the graphite, the solids content of said compound comprising 50–70% by weight fluorinated ethylene propylene and PTFE combined and 30–50% graphite, the ratio of fluorinated ethylene propylene to PTFE being between 3:1 and 1:10;
    drying the compound by heating below the initial melting point of fluorinated ethylene propylene; and
    heating the dried compound to between 560° F. and 700° F.

2. The process according to claim 1 wherein said solids content of said finished caulk is between 50% and 60% fluorinated ethylene propylene and PTFE combined.

3. The process according to claim 1 wherein the ratio of fluorinated ethylene propylene to PTFE is between 2:1 and 1:3.

4. The process according to claim 3 wherein said solids content of said finished caulk is between 50% and 60% fluorinated ethylene propylene and PTFE combined.

5. The process according to claim 4 wherein the ratio of fluorinated ethylene propylene to PTFE is about 1:1.

6. The process according to claim 4 wherein during the step of forming a compound a floccing agent is added to the stable aqueous dispersion of fluorinated ethylene propylene and PTFE.

7. The process according to claim 6 wherein said floccing agent is isopropanol, which is added in an amount equivalent to between 25% and 35% of the combined weight of fluorinated ethylene propylene, PTFE, graphite and isopropanol.

8. The process according to claim 4 wherein said heating of said dried caulk is done between 600° F. and 620° F. for at least one hour.

9. The process according to claim 3 wherein said caulk, when immersed in a bath of 400° F. 105% concentration phosphoric acid for 65 hours, will absorb no more than 6% of its own weight in acid.

10. The process according to claim 8 wherein said finished caulk has a coefficient of thermal conductivity of at least 0.6 BTU/ft·hr·°F. and absorbs no more than about 1% of its weight in acid.

11. The process according to claim 8 wherein said solids content is between 50% and 60% fluorinated ethylene propylene and PTFE combined, with a balance of graphite.

12. The process according to claim 11 wherein the ratio of fluorinated ethylene propylene to PTFE is about 1:1.

13. A thermally and electrically conductive and acid resistant caulk made by mixing sufficient particulate graphite into a stable aqueous dispersion of fluorinated ethylene propylene and PTFE to cause flocculation of all the fluorinated ethylene propylene and PTFE solids along with the graphite, drying the floc so formed and heating the dried floc to at least 560° F. and no greater than 700° F. for at least 0.5 hour, said caulk comprising 50–70% by weight fluorinated ethylene propylene and PTFE combined and 30–50% graphite, the ratio of fluorinated ethylene propylene to PTFE solids being between 3:1 and 1:10, and said caulk having a coefficient of thermal conductivity of at least 0.6 BTU/ft·hr·°F, and when immersed in a bath of 400° F. 105% concentration phosphoric acid for 65 hours it absorbs no more than about 3% of its own weight in acid.

14. The caulk according to claim 13 wherein said caulk comprises 50–60% fluorinated ethylene propylene and PTFE combined and 40–50% graphite, and absorbs no more than about 1% of its own weight in acid.

15. The caulk according to claim 14 wherein the ratio of fluorinated ethylene propylene to PTFE solids is about 1:1.

16. The caulk according to claim 15 wherein the coefficient of thermal conductivity is at least 0.8 BTU/ft·hr·°F.